United States Patent [19]
Kjellqvist

[11] 3,965,595
[45] June 29, 1976

[54] MOUNTING DEVICE OR BOOK FOR STORING, DISPLAYING AND HANDLING TRANSPARENT PICTURES

[75] Inventor: Erik Kjellqvist, Stockholm, Sweden

[73] Assignee: Almqvist & Wiksell Forlag AB, Sweden

[22] Filed: Dec. 16, 1974

[21] Appl. No.: 533,078

Related U.S. Application Data

[63] Continuation of Ser. No. 183,804, Sept. 27, 1971, abandoned.

[30] Foreign Application Priority Data

Oct. 6, 1970 Sweden.............................. 13539/70

[52] U.S. Cl............................. 40/104.18; 40/106.1
[51] Int. Cl.² .......................................... G09F 11/06
[58] Field of Search 40/102, 104.02, 104.17–104.19, 40/106.1; 35/28, 53, 54; 281/16; 40/2 AT

[56] References Cited
UNITED STATES PATENTS

| | | | |
|---|---|---|---|
| 1,076,257 | 10/1913 | Wiltz..................................... | 40/102 |
| 2,138,847 | 12/1938 | Felix ..................................... | 40/102 |
| 2,314,790 | 3/1943 | Jenter.................................... | 281/16 |
| 3,253,358 | 5/1966 | Wright................................ | 40/106.1 |
| 3,264,767 | 8/1966 | Coffmann .............................. | 40/102 |
| 3,524,703 | 8/1970 | Wright................................. | 40/102 X |

FOREIGN PATENTS OR APPLICATIONS

| | | | |
|---|---|---|---|
| 75,957 | 4/1954 | Netherlands........................... | 35/53 |
| 436,601 | 10/1935 | United Kingdom...................... | 35/53 |
| 779,319 | 7/1957 | United Kingdom.............. | 40/102 X |
| 700,347 | 12/1953 | United Kingdom.............. | 40/102 X |
| 869,436 | 5/1961 | United Kingdom.............. | 40/102 X |

*Primary Examiner*—Louis G. Mancene
*Assistant Examiner*—John H. Wolff
*Attorney, Agent, or Firm*—Stevens, Davis, Miller & Mosher

[57] ABSTRACT

A mounting or book for storing, displaying and handling transparencies having at least two sheet sets, each set containing at least one sheet which is pivotally mounted in the book in a manner so that any single sheet can be separately displayed or superimposed upon a single sheet of a further set. At least one carrier frame has a set of sheets hinged to it at one or both edges so that any sheet from a set can be pivoted toward the center of the carrier.

6 Claims, 5 Drawing Figures

MOUNTING DEVICE OR BOOK FOR STORING, DISPLAYING AND HANDLING TRANSPARENT PICTURES

This is a continuation of application Ser. No. 183,804, filed Sept. 27, 1971, now abandoned.

The present invention relates to a mounting device or book for the storage, display — preferably by a projector or the like — and handling of transparent picture sheets.

It is well known, inter alia for teaching purposes, to use books containing transparent picture sheets, in which case, for instance consecutive picture sheets of a sequence or suite of picture sheets in the book illustrate successive details forming part of a certain course of events. Further, a sequence or suite of transparent picture sheets may each illustrate associated details of a machine construction, on a map or the like, so that all the pictures of the sequence or suite, when superimposed on each other, will show the construction, map or the like as a whole. On displaying, initially the first picture, or basic picture, is shown, then the second picture is placed upon the first one, etc. In this way, in teaching, for example, the sum of knowledge can be built up step by step. Obviously, one single book may contain several such suites or sequences of transparent picture sheets, such sequences, however, being inherently fixed by the order of succession of the sheets in the book. Thus it will not be possible to vary any given series, lest one will not adopt a system of loose transparent picture sheets, which, however, are difficult to keep in order and furthermore are rather apt to disappear.

The present invention has for its object to provide a book of a kind which substantially facilitates the storage, display and handling of transparent pictures and which will also enable individual sequences of pictures to be varied.

This object has been accomplished in that the mounting device comprises at least two sheet sets each containing at least one sheet and being pivotally or hingedly mounted in the book relative to each other in such a way, sheets of the same set being mounted in common, that, in a display area common to the sets, any single picture sheet or any sequence of picture sheets of one set can be superposed on any single picture sheet or on any sequence of picture sheets in at least one further set. The invention enables "insertion" from at least two directions of transparent picture sheets so as to form in common a composed picture area. Thus, for instance, one set of sheets may contain a number of alternative basic pictures which are introduced into the picture area from one direction, while another set may contain superposition pictures for these basic pictures and which superposition pictures are introduced into the picture area from the other direction. The invention, of course, will enable numerous other combinations between the picture sheets contained in the picture sets of the storage device.

The invention will now be described more in detail with reference to the accompanying drawings, in which.

Figure 1:
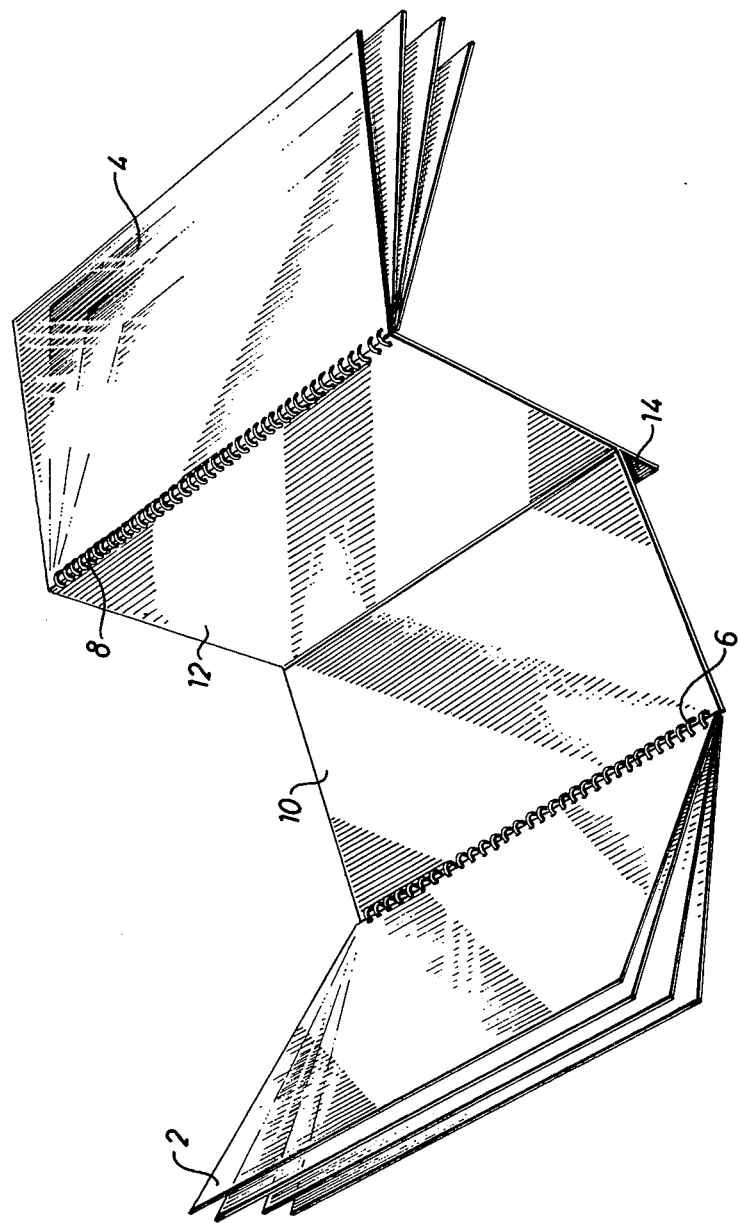
FIGS. 1 to 3 are perspective views illustrating one embodiment of the inventive mounting device in different positions.
Figure 2:
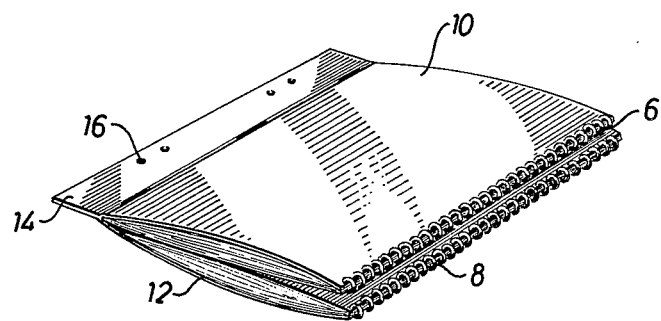

Referring specifically to FIG. 1, the mounting device or book shown therein comprises two sheet sets 2 and 4, respectively, containing each a plurality of sheets or leaves which are hinged by ring hinges 6 and 8, respectively, to the free outer edges of respective covers (picture set holders) 10 and 12. The covers 10 and 12 are interconnected at 14. FIG. 2 illustrates the book or folder thus described in a closed condition for storing the picture sheets in the intended position. As shown, the interconnection or spine portion 14, as conventional, is provided with punched holes 16 enabling the device to be inserted into a file.

Figure 3:
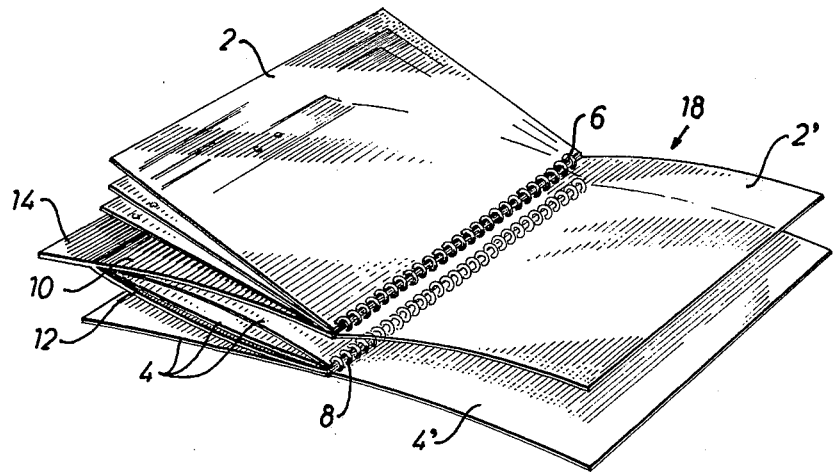

FIG. 3 illustrates the manner of using the device. From the position shown in FIG. 2, each set 2 and 4, respectively, of picture sheets, as well as the individual picture sheets of each set, are pivotable or turnable, on one hand, to a display position, for instance in the display area of a projector, the sheets being turned over into this position being viewed in the direction shown by arrow 18, and, on the other hand, into a position against the external surface of the respective covers 10 and 12, as shown in FIG. 3. The border of the display area is defined by the edge of cover 10 to which ring hinges 6 are attached. As readily seen, it is possible to superpose any individual picture sheet or any sequence of picture sheets of sheet set 2 onto any individual picture sheet or any sequence of picture sheets of set 4, such superposition taking place within the picture area as viewed in the direction of arrow 18. In FIG. 3, one picture sheet only from each set is folded out into the picture area. It can be assumed, for example, that the sheet set 4 contains a number of alternative basic pictures, and the sheet set 2 contains a number of superposition pictures for these basic pictures. Thus, in FIG. 3, an alternative basic picture designated by 4' is folded out, and superposed thereon is also folded out a superposition picture designated by 2'. A further possibility resides in that sheet set 2 may contain one or several picture sequences illustrating in common, for instance a sequence of events, a machine construction or the like, in which case each sheet of the sequence displays one step of such sequence of events or one detail of such construction. The sheet set 4, as well, may contain one or more such sequences. For displaying, the first sheet of a certain sequence is introduced into a certain sequence in the display area as viewed in the direction of arrow 18, then the second sheet upon the first one, etc. Now it is possible, in using the book or folder shown in FIG. 1 to 3, by a suitable disposition of said sheet sequences of sheet sets 2 and 4, to vary a given sequence in one or each set by introducing — in the course of display — into set 2 one or more sheets from set 4, it being possible at the same time to omit certain sheets of set 2 from such display. In this way there will be obtained within the display area as viewed in the direction of the arrow a variation of the sequence of events or the construction as illustrated by the original sheet sequence of set 2.

In the remaining Figures, numerals 2 and 4 are used throughout to designate two sheet sets in the embodiments illustrated by way of example.

Figure 4:
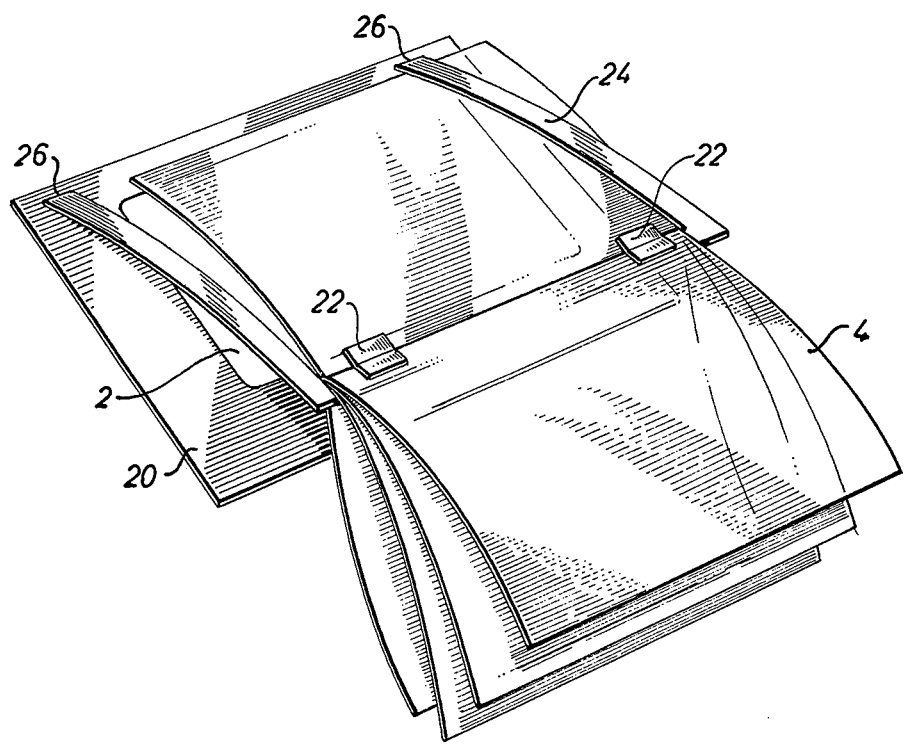
FIG. 4 is a perspective view of another embodiment.

In the embodiment shown in FIG. 4, one "sheet set" is constituted by one single transparent picture sheet 2, which is mounted in a base or mounting frame (picture set holder) 20 of the commercially available standard type for mounting transparencies. The picture sheets of the second set 4 are pivotally connected by hinges 22 to be described in detail hereinafter along one edge of a carrier frame (picture set holder) 24 which at its opposite edge is pivotally connected at 26 to one edge of the base frame 20 in the manner shown in FIG. 4, for instance by elements similar to the hinges 22. The aperture of the base or mounting frame 20, having inserted therein the "sheet set" 2, defines a display area for the two sheet sets 2 and 4 in common. It is readily seen that the device illustrated in FIG. 4 functions, in principle, in the same way as that of the first embodiment. In this case, however, one disposes of one basic picture only, i.e. picture 2, which can be varied by means of the superposition sheets of set 4. Owing to the manner shown of mounting the carrier frame 24 onto the base frame 20, any of the sheets, or several sheets, of set 4 can be superposed onto the basic picture 2.

The hinges 22 preferably are in the form of thin metal foils which are in part glued to a picture sheet and in part to the carrier frame 24. The employment of such metal foils constitutes a very simple and cheap way of securing the sheets, the number of sheets contained in a set, however, being limited due to the fact that the material thickness at the locations of the hinges 22 being rapidly increased, because each sheet at such location requires a metal foil. When using up to 4 or 5 sheets in a set, this arrangement, therefore, will be rather clumsy.

Figure 5:
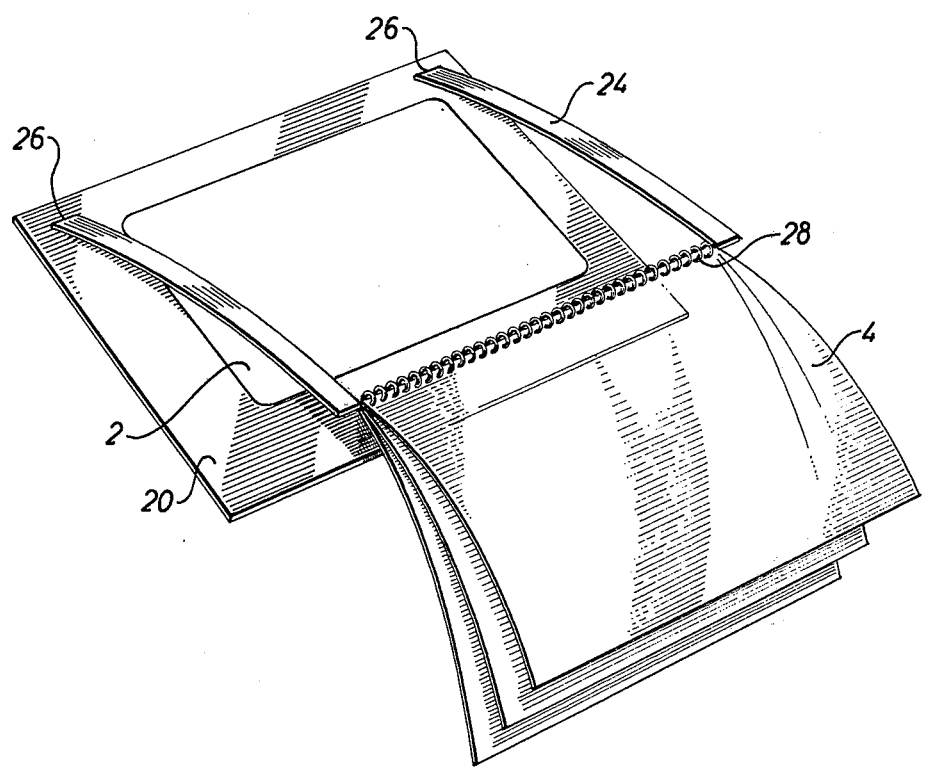
FIG. 5 is a perspective view of a modified form of the embodiment of FIG. 4.

FIG. 5 illustrates a modification in which a ring leaf holder 28 is relied on instead of foil hinges, the former having a greater capacity but being, at the same time, more expensive. The modification of FIG. 5 also enables the picture sheets, after display, to return directly to their initial position. In the construction of FIG. 4, the picture sheets must be turned back past the display area to be returned into their initial position. Otherwise, the embodiments of FIGS. 4 and 5 are identical.

Figure 6:
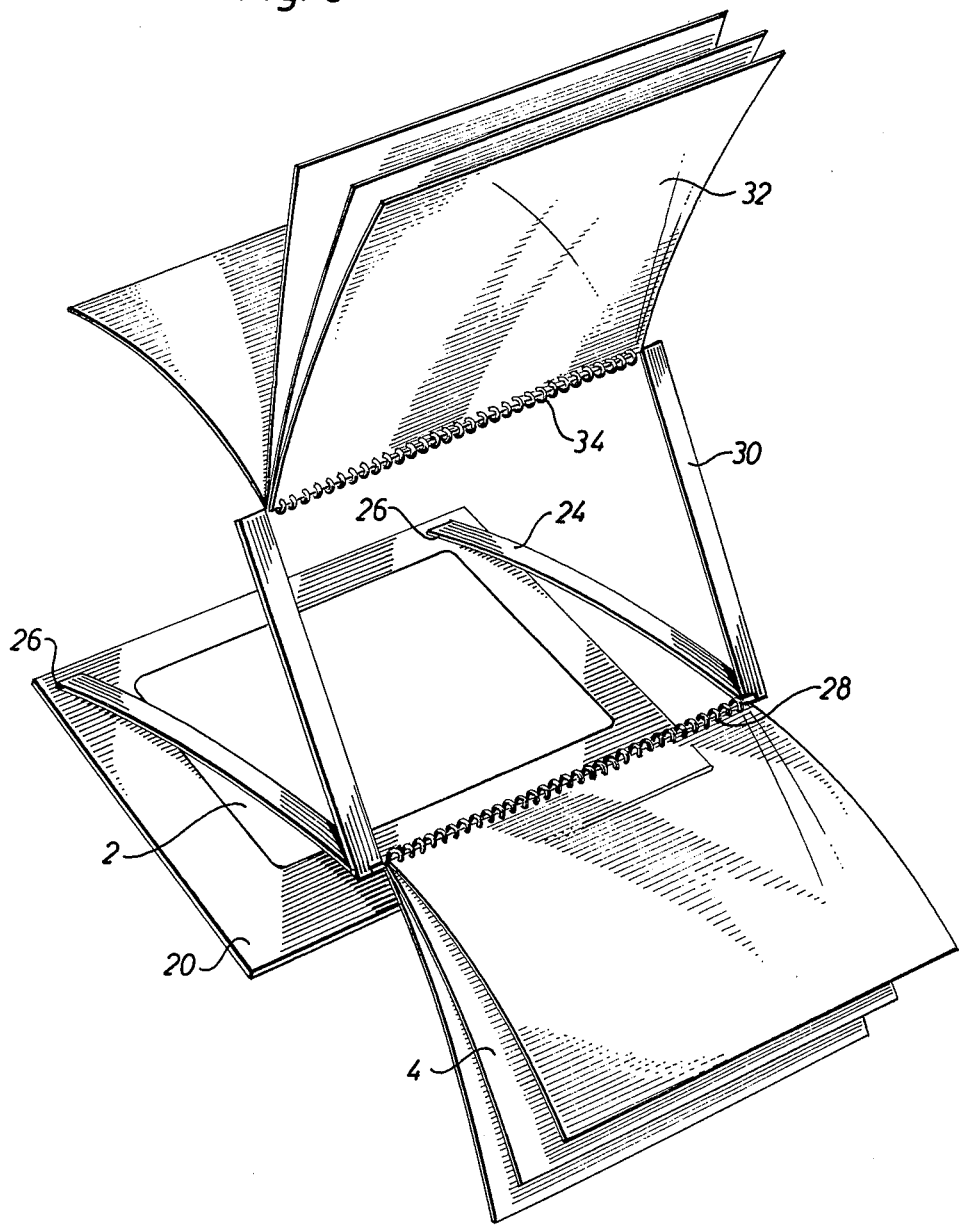
FIG. 6 is a perspective view illustrating a further modified form of this same embodiment of the invention.

FIG. 6 illustrates a further modification of the two previous embodiments. The device here shown comprises an additional carrier frame 30 which has hinged thereto, at one longitudinal edge thereof, a further set of sheets 32 connected thereto by a ring leaf holder 34, just as the carrier frame 24 carries the sheet set 4 in FIG. 5. The arrangements 4-24 and 32-30, respectively, may be identical but are not necessarily so. The carrier frame 30 at its other longitudinal edge is hinged or pivotally connected to the edge of the carrier frame 24 carrying the sheet set 4. The interconnection between frames 24 and 30 may be detachable, if desired. The two shorter edge members of frames 24 and 30 may consist, for instance, of thick plastic strips interconnected at their end or ends, respectively, by rods carrying the ring leaf holders 28 and 34. In this case, the interconnection of frames 24 and 30 may be so devised, for example, that the rod carrying the ring leaf holder 28 is associated with the two frames in common.

In the embodiment of FIG. 6, the frame 20 can only serve as a mounting frame and, thus, cannot contain any basic picture 2, as was the case in the embodiments of FIGS. 4 and 5, but, of course, there is nothing to prevent the incorporation of such a basic picture in the device of FIG. 6, as well.

It is readily seen that the book, folder or storage device of FIG. 6 will afford further versatility over that afforded by the embodiments of FIGS. 4 and 5, owing to the addition of sheet set 32. The intention, of course, is that the sheets of sheet set 32, as well, are to be introduced into the picture area of the base or mounting frame 20 for display. Frame 20, as in the embodiment of FIG. 4, can suitably be a conventional frame of the kind which is commercially available and is used as a mounting frame or slide for text projectors or the like, the same being preferably provided with punched holes enabling the same to be inserted into a file. In the collapsed condition of the devices according to FIGS. 4 to 6, of course, all the sheet sets are folded in against mounting frame 20.

The invention of course, is not restricted to the embodiments described hereinbefore, but is susceptible of various modifications without departing from the scope of the appended claims. In the embodiment of FIG. 1, the book or mounting device may contain a plurality of carrier sheets corresponding to covers 10 and 12 and each having pivotally connected or hinged to its free outer end edge further sets of transparent picture sheets. In the embodiments of FIGS. 4 to 6, it would also be conceivable, although possibly less practical, also to let one or both of the short edges of the frames 24 and/or 30 carry pivotally arranged sheet sets.

The invention, obviously, affords a versatile mounting device for displaying transparent pictures, and a device which considerably simplifies the storage, display and handling of transparent picture sheets, at the same time enabling variation of individual picture sequences. Particular advantages of the invention include the possiblity of utilizing a base frame of a commercially available standard type, and that of optionally introducing and removing one or more of the sheets of a sheet set into and out of the picture area of the base frame.

What I claim is:

1. A mounting device for displaying pictures in a random sequence, comprising:
   a first picture set holder including at least one transparent picture sheet having at least one picture for display, a first carrier member and first means pivotally mounting said at least one transparent picture sheet to one edge of said first carrier member;
   a second picture set holder for holding at least two pictures for display, said second picture set holder including at least two transparent picture sheets having at least one picture on each of said picture sheets for display, and a second carrier member, said first mounting means pivotally mounting said at least two transparent picture sheets to one edge of said second carrier member, for rotation about a common pivot axis through an angle of substantially 360° about said common pivot axis; and
   second means pivotally mounting said first and second carrier members to each other at their respective opposite edges from said one edge of each said carrier member for movement relative to a display area border of said first picture set holder such that any of said at least two picture sheets is selectively superimposable on said at least one transparent picture sheet of said first picture set holder.

2. A mounting device for diplaying pictures in a random sequence, comprising:
   a first picture set holder including at least one transparent picture sheet having at least one picture for display, and a base frame having a display area defining aperture;
   a second picture set holder for holding at least two pictures for display, said second picture set holder including at least two transparent picture sheets having at least one picture on each of said picture sheets for display, and at least one carrier frame;

first means pivotally mounting said at least two picture sheets about a common pivot axis for rotation through an angle of substantially 360° about said common pivot axis; and second means pivotally mounting said at least one carrier frame, at a second edge thereof, to said base frame to permit the selective alignment of at least one of said transparent picture sheets of at least one picture set holder with said aperture for display of the selected at least one picture sheet.

3. A device according to claim 2, wherein said second edge of said at least one carrier frame is opposite said one edge thereof.

4. A device according to claim 2, wherein a picture sheet containing a basic picture is mounted in the base frame.

5. A device according to claim 2, further comprising:

a further carrier frame, including at least one further transparent picture sheet having a picture for display, pivotally mounted to one edge of said further carrier frame; and means pivotally mounting said further carrier frame, at a second edge thereof opposite said one edge thereof, to said one edge of said at least one carrier frame mounted to said base frame.

6. A device according to claim 5, wherein said two carrier frames are releasably interconnected.

* * * * *